United States Patent
Morishima

(10) Patent No.: US 7,324,417 B2
(45) Date of Patent: Jan. 29, 2008

(54) OPTICAL DISC RECORDING APPARATUS

(75) Inventor: Morito Morishima, Fukuroi (JP)

(73) Assignee: Yamaha Corporation, Hamamatsu-shi (JP)

( * ) Notice: Subject to any disclaimer, the term of this patent is extended or adjusted under 35 U.S.C. 154(b) by 444 days.

(21) Appl. No.: 10/607,763

(22) Filed: Jun. 27, 2003

(65) Prior Publication Data

US 2004/0001409 A1   Jan. 1, 2004

(30) Foreign Application Priority Data

Jun. 27, 2002   (JP)   ............... 2002-188167

(51) Int. Cl.
G11B 7/00   (2006.01)
(52) U.S. Cl. .................. 369/53.18; 369/116
(58) Field of Classification Search ............. 369/53.18
See application file for complete search history.

(56) References Cited

U.S. PATENT DOCUMENTS 6,111,841 A * 8/2000 Iida et al. ............... 369/47.53
6,818,591 B2 * 11/2004 Arai et al. ................ 503/201

FOREIGN PATENT DOCUMENTS

| JP | 01-191330 | 8/1989 |
| JP | 03-219428 | 9/1991 |
| JP | 06-044595 | 2/1994 |
| JP | 09-270128 | 10/1997 |
| JP | 09-312021 | 12/1997 |
| JP | 10-329460 | 12/1998 |

OTHER PUBLICATIONS

JP 01-191328 Miyajima Giichi Aug. 1989 (abstract).*
JP 0-260148 Shimizu Tadashi Oct. 1990 (abstract).*
Japanese Office Action dated Nov. 8, 2005.

* cited by examiner

Primary Examiner—Wayne Young
Assistant Examiner—Van T. Pham
(74) Attorney, Agent, or Firm—Pillsbury Winthrop Shaw Pittman LLP

(57) ABSTRACT

An optical disc recording apparatus 100 comprises a temperature detecting circuit 141 for detecting a temperature of an optical disc 200 and corrects a laser power for discoloration a discoloration layer of the optical disc 200 in accordance with the temperature detected by the temperature detecting circuit 141 in order to cancel a change in the temperature of the optical disc 200. The optical disc recording apparatus 100 can record a high quality visible image on an optical disc without a printer.

5 Claims, 9 Drawing Sheets

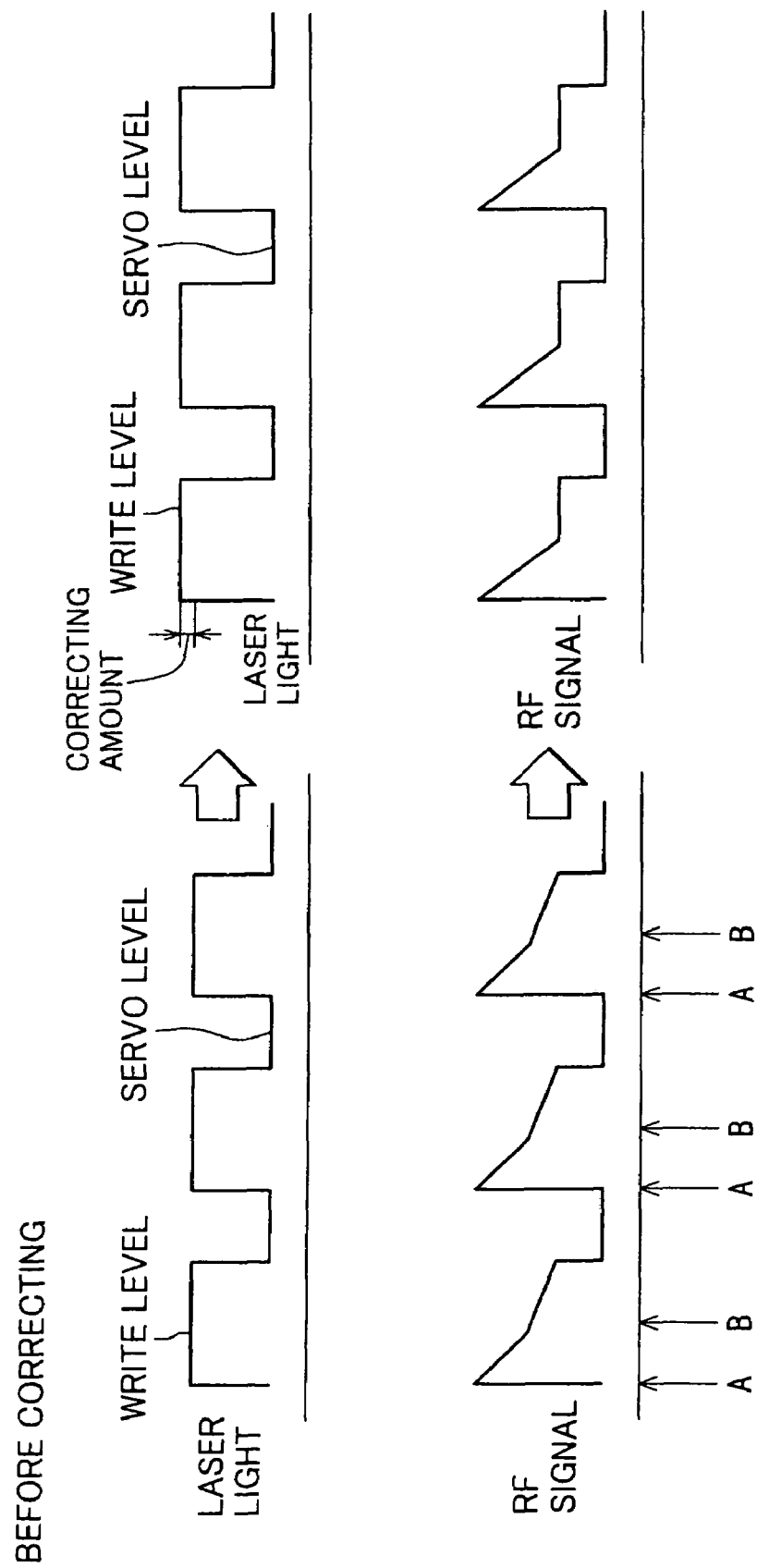

OPTICAL DISC RECORDING APPARATUS

CROSS REFERENCE TO RELATED APPLICATION

This application is based on Japanese Patent Application 2002-188167, filed on Jun. 27, 2002, the entire contents of which are incorporated herein by reference.

BACKGROUND OF THE INVENTION

A) Field of the Invention

This invention relates to an optical disc recording apparatus that records a visible image in an optical disc.

B) Description of the Related Art

Conventionally, there has been an optical disc recording apparatus for recording information to a recordable optical disc such as a compact disc-recordable (CD-R), a compact disc rentable (CD-RW) and the like. The optical disc recording apparatus irradiates laser light to a recording surface of the optical disc and records information by controlling the laser light corresponding to data to be recorded.

On the other hand, on the opposite side of the recording surface of the optical disc, a label surface is provided. The label surface is used as a writing area on which a user writes recording contents of the optical disc. In recent years, a user generally designs an image of a label surface by using a personal computer (hereinafter called PC) and prints it to a label sheet for adhering to the label surface by a using printer. Also, the user generally prints the image directly on the label surface of the optical discs by using the printer.

For printing the original image on the label sheet, the printer is necessary. Moreover, when the label sheet is used, a user may fail in adhering it to the label surface, and the operation will be complicated. On the other hand, when direct print is executed on the label surface, failure is hardly to occur. However, it is necessary to purchase a printer having a function for printing directly on the label surface.

On the recording surface of the optical disc, information recording is executed by changing reflectivity of a recording layer with the laser light. The inventor of the present invention aimed at changing the colors at a time of information recording, and conceived recording a visible image on the optical disc by the laser light.

However, since a conventional optical disc recording apparatus irradiates a laser light with an identical power, duration (hereinafter called recording sensitivity) to reach a color developing temperature by the laser light is changed when a temperature of the optical disc has changed. The variation in the recording sensitivity causes gaps of color developing positions and contrasts, and the outline of a visible image will fade, or spots will be produced in the contrasts.

On the other hand, some of the conventional optical disc recording apparatuses set laser power for every optical disc. However, this type of the optical disc recording apparatuses keep the laser power fixed up at a time of recording. Therefore, the point that the variation arises in the recording sensitivity according to the temperature of the optical disc remains the same.

SUMMARY OF THE INVENTION

It is an object of the present invention to provide an optical disc recording apparatus that can record a visible image on an optical disc at high quality without a printer.

According to one aspect of the present invention, there is provided an optical disc recording apparatus, comprising: a light irradiator that irradiates a laser light onto an optical disc having a discoloration layer; a position controller that controls an irradiating position of the laser light; a laser power controller that controls a laser power of the laser light in accordance with input image data; a temperature detector that detects a temperature of the optical disc; and a laser power corrector that corrects laser power for discoloration the discoloration layer by the laser light in accordance with the detected temperature in order to cancel a change in a temperature of the optical disc.

According to this structure, as the temperature change of the optical disc is canceled, the laser power is corrected at a time of discoloration the above-described discoloration layer by the laser light. Therefore, a temperature at a laser irradiating position can be fixed, and recording sensitivity can be fixed.

According to another aspect of the present invention, there is provided an optical disc recording apparatus, comprising: a light irradiator that irradiates a laser light onto an optical disc having a discoloration layer; a position controller that controls an irradiating position of the laser light; an optical disc rotatory that rotates the optical disc; a laser power controller that controls a laser power of the laser light in accordance with input image data; a temperature detector that detects a temperature of the optical disc; and a rotation controller that controls a rotation velocity of the optical disc in accordance with the detected temperature in order to cancel a change in a temperature of the optical disc.

According to this structure, as the temperature change of the optical disc is canceled, the rotation velocity of the optical disc is controlled. Therefore, a temperature at a laser irradiating position can be fixed and recording sensitivity can be fixed.

According to still another aspect of the present invention, there is provided an optical disc recording apparatus, comprising: a light irradiator that irradiates a laser light onto an optical disc having a discoloration layer; a position controller that controls an irradiating position of the laser light; laser power controller that controls a laser power of the light in accordance with input image data; a light receiver that receives a reflected light of the laser light reflected by the optical disc and outputs a light receiving signal representing a light receiving level; and a laser power corrector that corrects laser power to maintain a changing rate of the light receiving level to be a changing rate with in a range determined in advance when the laser light at a laser power for discoloration the discoloration layer in accordance with the input image data.

According to this structure, since the laser power of the laser light is controlled so that the changing rate of the light receiving level is maintained to be a changing rate of the predetermined range, the discoloration layer can be certainly discolored.

According to yet another aspect of the present invention, there is provided an optical disc recording apparatus, comprising: a light irradiator that irradiates a laser light onto an optical disc having a discoloration layer; a position controller that controls an irradiating position of the laser light; an optical disc rotatory that rotates the optical disc; a laser power controller that controls a laser power of the laser light in accordance with input image data; a light receiver that receives a reflected light of the laser light reflected by the optical disc and outputs a light receiving signal representing a light receiving level; and a rotation controller that controls a rotation velocity of the optical disc to maintain a changing rate of the light receiving level to be a changing rate with in a range determined in advance when the laser light at a laser power for discoloration the discoloration layer in accordance with the input image data.

According to this structure, since the rotation velocity of the optical disc is controlled so that the changing rate of the light receiving level is maintained to be a changing rate of the predetermined range, the discoloration layer can be certainly discolored.

According to the present invention, it is possible to record a visible image on an optical disc at high quality without a printer.

BRIEF DESCRIPTION OF THE DRAWINGS

FIG. 9 is an image for explaining a modified example.

DETAILED DESCRIPTION OF THE PREFERRED EMBODIMENTS

Before explaining about an optical disc recording apparatus 100 according to an embodiment of the present invention, a structure of an optical disc 200, on a label surface of which a visible image is recorded by this optical disc recording apparatus 100 is explained first.

Figure 1:
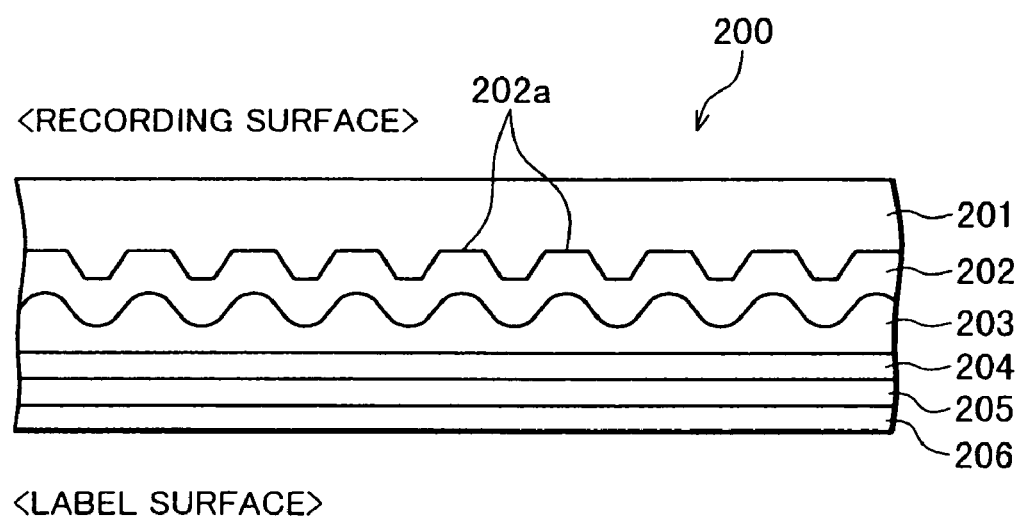
FIG. 1 is a cross sectional view of an optical disc used for an optical disc recording apparatus according to an embodiment of the present invention.

FIG. 1 is a cross sectional view of the optical disc 200. As shown in the drawing, a laminating layer of a protection layer 201, a recording layer 202, a reflection layer 203, a protection layer 204, a thermosensitive layer 205 and a protection layer 206 in such order constructs the optical disc 20. Moreover, FIG. 1 is just a simulated type, and an actual size ratio of each layer is not necessarily the same as being shown in this diagram.

On the recording layer 202, a groove (guide groove) 202a is formed spirally on a surface (an upper part of the drawing). When information is recorded on this optical disc 200, laser light is irradiated along with this groove 202a.

That is, for recording information on the optical disc 200, a surface (hereinafter called "recording surface") on the protection layer 201 side of the optical disc 200 is set so that it encounters with an optical pickup (explained in detail later) of the optical disc recording apparatus 100. Then, the information is recorded by moving a laser light irradiated by the optical pickup along with the groove 202a.

On the other hand, when a visible image is recorded on the surface of the optical disc 200, the optical disc 200 is set so that a surface (hereinafter called "label surface") of the protection layer 206 encounters with the optical pickup of the optical disc recording apparatus 100. Then, a desired position of the thermosensitive layer 205 is discolored by irradiating the laser light on the thermosensitive layer 205 to form an image. Moreover, the optical disc 200 has almost the same structure as a conventional CD-R disc except the thermosensitive layer 205. Therefore, a lead-in area of the optical disc 200 is the same as that of the conventional CD-R disc, and absolute time in pregroove (ATIP) information such as a type and layout of a medium, an ideal laser power, a writing velocity, manufacturing brand and the like is recorded in advance.

Next, the optical disc recording apparatus 100 according to the embodiment of the present invention is explained. The optical disc recording apparatus 100 is an apparatus that can record information on the recording surface and the visible image on the label surface of the above-described optical disc 200.

Moreover, the optical disc recording apparatus 100 is connected to a personal computer (hereinafter called PC) 300 via a signal cable (not shown in the drawing), and recording data to be recorded on the recording surface and image data corresponding to the visible image are input via the signal cable. An arbitral interface standard can be applied for connection between the optical disc recording apparatus 100 and the PC 300, for example, Small Computer System Interface (SCSI) Standard, Institute of Electrical and Electronic Engineers (IEEE) 1394 Standard, AT Attachment Packet Interface (ATAPI) Standard, Universal Serial Bus (USB) Standard or the likes can be used.

Figure 2:
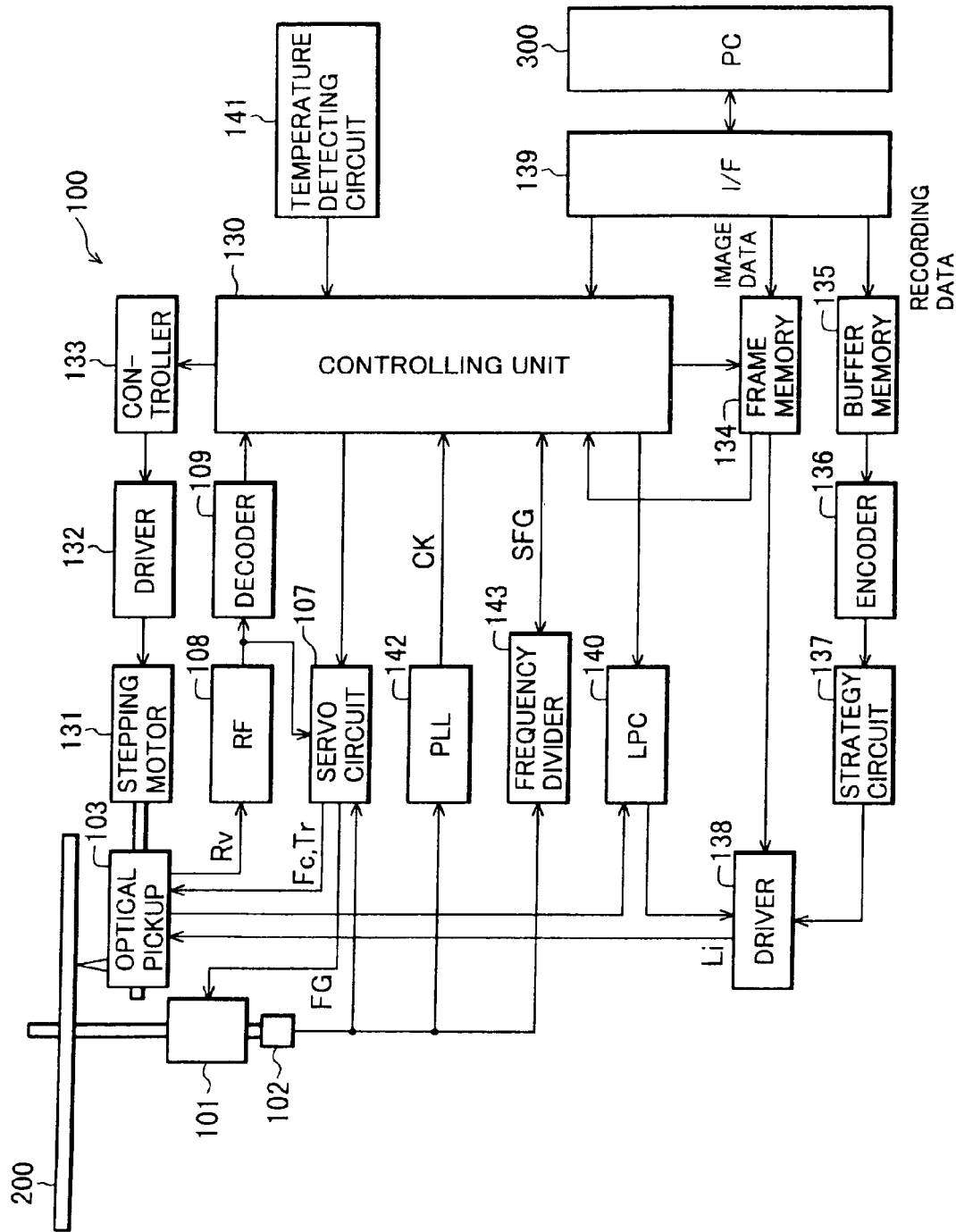
FIG. 2 is a block diagram showing an electrical structure of the optical disc recording apparatus.

FIG. 2 is a block diagram showing an electrical structure of the optical disc recording apparatus 100. In this diagram, a spindle motor 101 rotatively drives the optical disc 200. A frequency generating device 102 uses spike current of the spindle motor 101 and outputs a pulse signal FG with a frequency corresponding to a spindle rotation velocity (rotation per unit time). The optical disc recording apparatus 100 according to the embodiment of the present invention performs information recording and image recording by a Constant Angular Velocity (CAV) method. Therefore, the spindle motor 101 rotatively drives the optical disc 200 with a fixed angular velocity.

Figure 3:
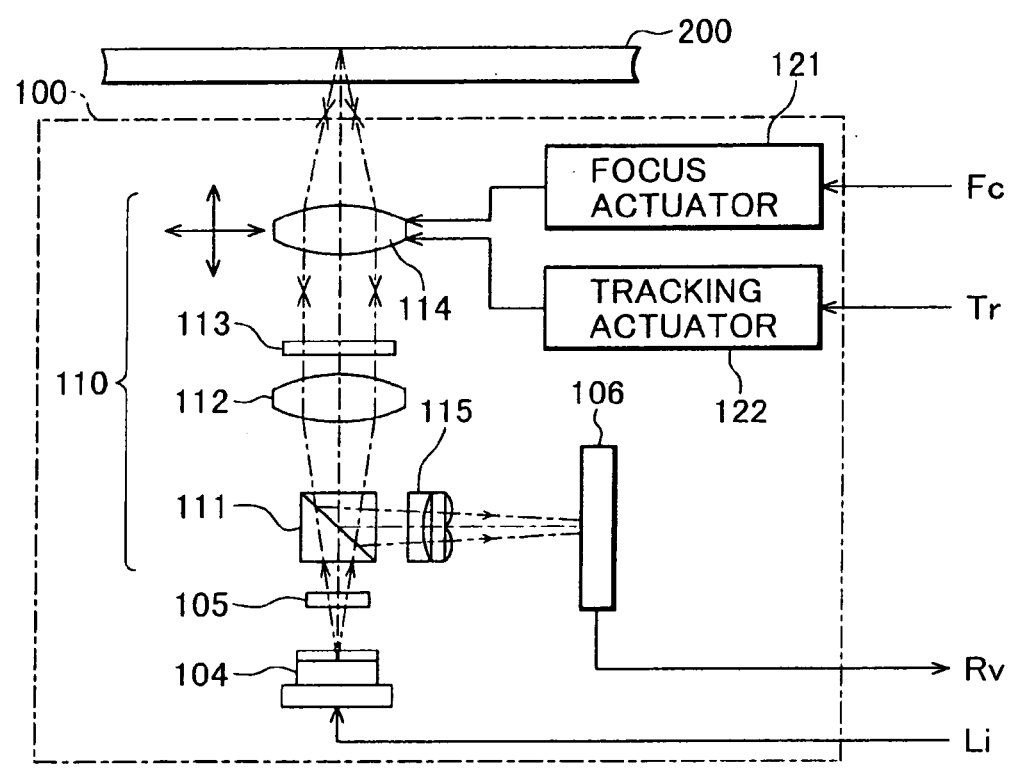
FIG. 3 is a diagram showing a structure of an optical pick-up.

An optical pickup 103 is a unit for irradiating a laser light onto the optical disc 200. Its structure is shown in FIG. 3. As shown in the drawing, the optical pickup 103 equips with a laser diode 104 radiating laser light, a diffraction grating 105, an optical system 110 concentrating the laser light on the surface of the optical disc 200 and a light receiving device 106 receiving a reflection light of the irradiated laser light. Moreover, the laser diode 104 irradiates a laser light corresponding to a drive signal Li from the laser driver (refer to FIG. 2).

The laser light irradiated from the laser diode 104 is separated into a main beam, a preceding beam and a following beam, and these three beams are concentrated on the surface of the optical disc 100 passing through a following beam splitter 111, a collimator lens 112, a ¼ wave plate 113 and an object lens 114. On the other hand, the three laser beams reflected at the optical disc 200 is reflected at the following beam splitter 111 passing through the object lens 114, the ¼ wave plate 113 and a collimator lens 112 again and concentrated by a cylindrical lens 115 to be irradiated into the light receiving device 106. The light receiving device 106 outputs a signal corresponding to the light reception as a light receiving signal Rv to an RF amplifier (refer to FIG. 2).

As shown in FIG. 3, the object lens 114 is held by a focus actuator 121 and a tracking actuator 122. The focus actuator 121 moves the object lens 114 toward an optical axis direction according to a focus error signal Fc from a servo circuit 107 (refer to FIG. 2). On the other hand, the tracking actuator 122 moves the object lens 114 toward a diameter direction according to a tracking error signal. Tr from the servo circuit 107. By doing that, focus control and tracking control are executed.

The servo circuit 107 executes a rotation velocity control of the spindle motor 101, a focus control and a tracking control of the optical pickup 103. More in detail, a pulse signal FG from the frequency generating device 102 and an instruction signal from the controlling unit 130 are input to the servo circuit 107, and the servo circuit 107 controls the spindle motor 101 to make the rotation velocity of the spindle motor 101 indicated by the pulse signal FG approximately the same as the rotation velocity indicated by the instruction signal. As described in the above, in the optical disc recording apparatus 100 according to the embodiment of the present invention, since the CAV method is applied, the servo circuit 107 rotatively drives the spindle motor 101 at a fixed angular velocity instructed by the controlling unit 130. Moreover, it is not limited to the CAV method, there is a Constant Linear Velocity (CLV) method that rotatively drives the optical disc 200 at a fixed linear velocity. Of course, any of the above-described method may be used.

Also, a light receiving signal Rv from the light receiving device 106 of the optical pickup 103 is input to the servo circuit 107 via the RF amplifier 108, and the servo circuit 107 generates a focus error signal Fc and a tracking error signal Tr corresponding to the light receiving signal Rv.

The RF amplifier 108 amplifies the receiving light Rv from the optical pickup 103 and outputs it to the servo circuit 107 and a decoder 109 as a RF signal. Here, the RF signal becomes an EFM (Eight to Fourteen Modulation) modulated signal at a time of information reproduction of the optical disc 200. The decoder 109 performs EFM demodulating of received RF signal to generate reproducing data and outputs to the controlling unit 130.

A stepping motor 131 is a motor for moving the optical pickup 103 toward a diameter direction of the optical disc 200. A motor driver 132 rotatively drives the stepping motor 131 corresponding to the pulse signal provided from a motor controller 133. The motor controller 133 generates a pulse signal corresponding to a moving amount and a moving direction in accordance with a moving starting instruction including a moving direction and a moving amount toward the diameter direction of the optical pickup 103 instructed by the controlling unit 130 and provides the generated pulse to the motor driver 132.

By moving the optical pickup 103 toward the diameter direction of the optical disc 200 by the stepping motor 131 and rotating the optical disc 200 by the spindle motor 101, an irradiating position of the laser light from the optical pickup 10 can be moved to various positions of the optical disc 200, and these structural elements consist position controlling means.

Next, a buffer memory 135 and a frame memory 134 temporarily store various types of data provided from the PC 300 via an interface 139. In detail, the buffer memory 135 stores recording data to be recorded on the recording surface of the optical disc with Fast In Fast Out (FIFO) method. An encoder 136 performs an EFM modulation on the recording data read from the buffer memory 135 to output to a strategy circuit 137. The strategy circuit 137 performs a time axis correcting process to data provided from the encoder 136 to output to a laser driver 138.

Figure 4:
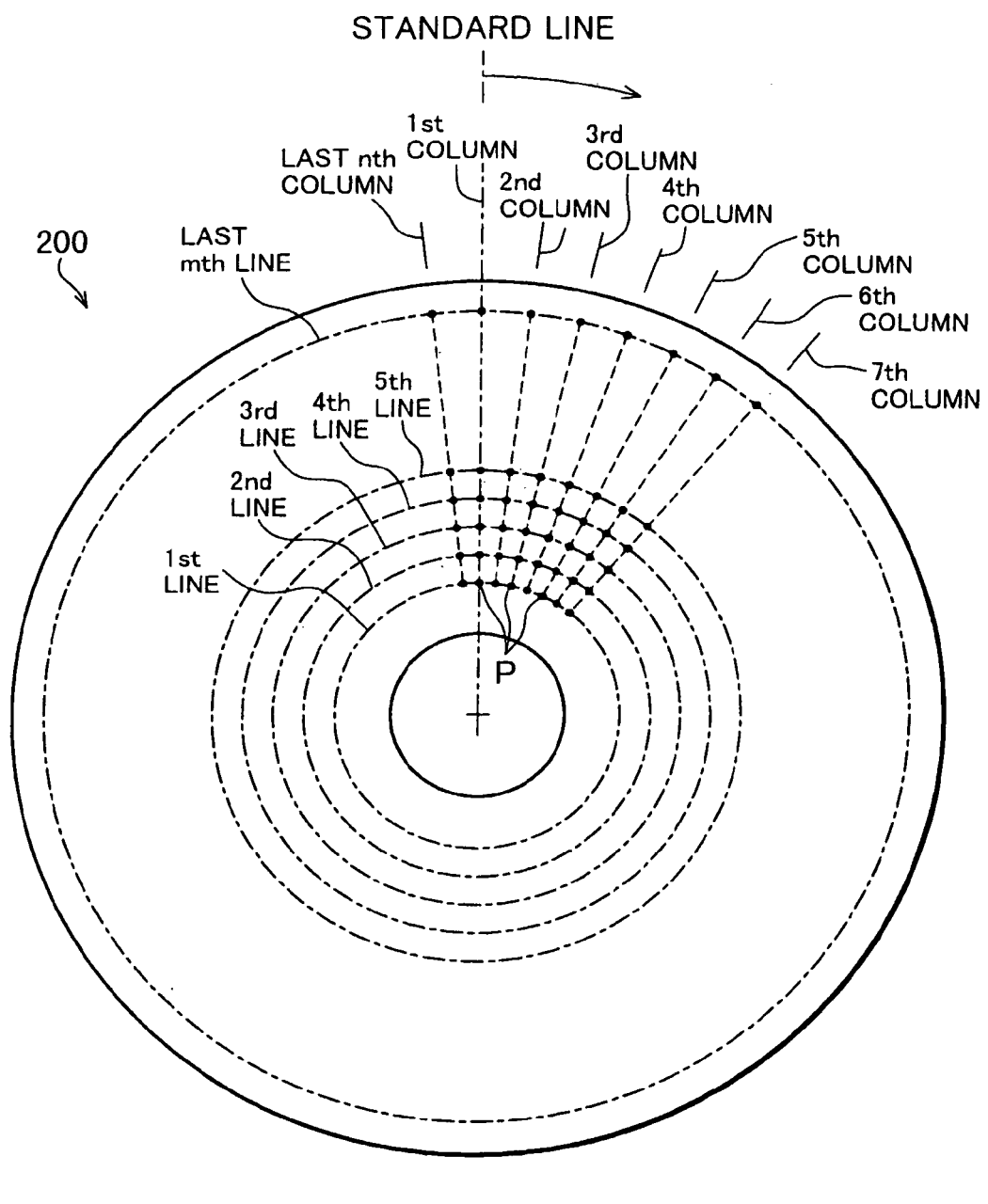
FIG. 4 is an image for explaining a coordinates of the optical disc determined by an image data.

On the other hand, the frame memory 134 stores image data of the visible image to be formed on the optical disc 200. This image data is a set of data to determine a concentration (contrast) of pixels to be drawn on the optical disc 200. As shown in FIG. 4, each pixel P is defined in correspondence with each intersection between a concentric circle of the optical disc 200 and radiation from the center. In order to explain the intersection coordinates in the optical disc 200, concentric circles are sequentially defined to be a first line, a second line, a third line, . . . , an mth line (the last line) from the inside to the outside of the disc, and when one radiating line is defined to be a standard line, the other radiating lines are sequentially defined to be a first column, a second column, a third column, . . . , an nth column (the last column) in a clockwise order. This drawing shows each pixel position in simulate, actually each pixel is arranged more closely.

The reason for defining an arrangement of pixels in that manner is following. On the Standard, the optical disc rotates counterclockwise looking from the recording surface at a time of information recording to the optical disc 200, and the optical pickup has a structure to move from the inside to the outside. When the above-described structure is premised, even in a state that the label surface is set to be encountered with the optical pickup 103, the optical disc 200 rotates counterclockwise, and the optical pickup 103 moves from the inside to the outside. Therefore, when the optical disc 200 is looked from the optical pickup 103, the optical disc 200 rotates counterclockwise and moves from the inside to the outside of the optical disc 200. The order of the above-described arrangement of pixels is corresponding to a scanning order of this optical pickup 103.

Corresponding to that, image data are stored in the frame memory 134 in an arrangement of m lines and n columns. The image data stored in the frame memory 134 are readout line by line by the controlling unit 130 to be provided to the laser driver 138 pixel by pixel.

The laser driver 138 drives the laser diode 104 of the optical pickup 103 in accordance with control of laser power controlling circuit 140 in accordance with modulated data provided from the strategy circuit 137 at a time of information writing and in accordance with image data provided from the frame memory 134 at a time of visible image recording.

On the other hand, laser power of the laser diode 104 is controlled as follows. That is, the optical pickup 103 has a front monitor diode (not shown in the drawing), and the front monitor diode receives a monitor light (light from a back of a chip of the laser diode 104) of the laser diode 104, and generates electric current corresponding to a light receiving amount. Then the generated electric current is output to the laser power controlling circuit 140 as a monitor electric current.

The laser controlling circuit 140 controls the laser power irradiated from the laser diode 104 corresponding to the input monitor electric current value. In concrete, the laser power controlling circuit 140 uses the monitor electric current value and executes feedback control of the laser driver 138 so that the laser light at the target laser power is irradiated from the optical pickup 103. A target value of the laser power is an ideal laser value instructed by the controlling unit 130, and actually a monitor electric current value corresponding to the laser power is instructed.

A temperature detecting circuit 141 is connected to a temperature-dependent device (not shown in the drawing) such as a thermistor, and a temperature of a circuit substrate of the optical disc recording apparatus 100 is measured by the temperature-dependent device, and the measured temperatur is informed to the controlling unit 130.

An inner temperature of the optical disc recording apparatus 100 becomes higher than an outer temperature by heat emitted from various kinds of motors and circuits of the laser diode 104. On the other hand, since the optical disc 200 is positioned in an inner part of the optical disc recording apparatus 100, it becomes to be almost the same temperature as the inner temperature of the optical disc recording apparatus 100 by heat death. Then, in the embodiment of the present invention, since the optical disc 200, the circuit substrate and the like are positioned closely in the optical disc recording apparatus 100, the temperature of the optical disc 200 is regarded as same as that of the circuit substrate except a portion positioned near a heat source such as the laser diode 104, and temperature of the optical disc 200 is measured by measuring the temperature of the circuit substrate. That is, although the temperature-dependent device may be positioned anywhere the temperature of the optical disc 200 can be measured, it is the easiest and the most reliable to position it on the circuit substrate. Therefore, in the embodiment of the present invention, the temperature of the circuit substrate is measured.

The controlling unit 130 is consisted of a central processing unit (CPU), a read only memory (ROM), a random access memory (RAM) and the like, and the controlling unit 130 is consisted so that the information recording process on the recording surface of the optical disc 200 and the visible image recording process on the label surface are controlled in central.

Next, an operation of the optical disc recording apparatus 100 according to the embodiment of the present invention is explained. A main feature of the optical disc recording apparatus 100 is recording of a visible image to the optical disc 200. On the other hand, in addition to the conventional information recording function, a secondary feature is a multi-purpose device that also has the visible image recording function. Hereinafter, operation at a time of information recording is explained briefly, and operation at a time of the visible image recording that is a feature of the present invention is explained in detail.

In the optical disc recording apparatus 100, when the optical disc 200 is set, the controlling unit 130 executes the rotation control of the spindle motor 101 by the servo circuit 107 so that the angular velocity of the optical disc 200 becomes a predetermined angular velocity. Also, the controlling unit 130 rotates a stepping motor 131 by executing moving start instruction to a motor controller 133 to the optical pickup 103 to a position where is equivalent to a lead-in area.

Next, the controlling unit 130 judges whether ATIP information is recorded or not. When the Judging result is positive, the recording surface is judged to be set toward the optical pickup, and the process proceeds to the information recording process.

On the other hand, the judging result is negative, the label surface is judged to be set toward the optical pickup, and the process proceeds to the visible image recording process.

The information recording process is almost the same as a conventional method. When the controlling unit 130 judges that the ATIP information is recorded, the ATIP information is read first. As described in the above, since information of a medium type, an ideal laser power and a manufacturer brand are written properly in the ATIP information, the controlling unit 130 sets a target value of the laser power based on these information. In concrete, the controlling unit 130 executes a process that the ideal laser power value written in ATIP information sets to the target value without changing or a process to select the target value of the laser power referring a table that corresponds to the manufacturer brand and the laser power based on the information written in the ATIP information such as the manufacturer brand. Then, the target value of the laser power for the laser power controlling circuit 140 is set. By doing that, the controlling unit 130 sets the target value of the laser power easily based on the ATIP information.

Here, the controlling unit 130 also increases the target value of the laser power as a light irradiating position going toward the outside based on the light irradiating position at a time of information recording and the visible image recording. Since the embodiment of the present invention adopts the CAV method, the laser power (recording power) per unit area changes unless making the laser power change corresponding to linear velocity.

On the other hand, when the recording data is provided from the PC 300, the controlling unit 130 records the recording data in the buffer memory 135 and reads out in a recorded order to be executed the EFM demodulation by the encoder 136. Then, a time axis correction process is executed by the strategy circuit 137.

Next, the controlling unit 130 controls the laser driver 138 to change the laser power of the laser light irradiated from the optical pickup 103 to a write level and a servo level in accordanc with data from the strategy circuit 137. The write level is a power level to change reflectivity of the laser irradiating area sufficiently to a recording layer 202 of the optical disc 200. On the other hand, although the servo level is a power level not to change reflectivity of the laser irradiating area, it is a level to satisfy the power level to obtain a recording write level that can execute tracking control and focus servo control.

Here, this write level is set to be controlled by the target value of the laser power set by the controlling unit 130 from the ATIP information by the laser power controlling circuit 140. By doing that, the recording data is recorded to the optical disc 200 at a low error rate. Moreover, at a time of information recording, at the same time of the above-described process, the rotation control of the spindle motor 101, the tracking control for tracking group and focus control are always executed, and the recording data is recorded along with the groove 202a of the optical disc 200 from inside.

Next, operation at a time of visible image recording is explained. However, at a time of visible image recording, the rotation control of the spindle motor 101 and the focus control is always executed, the tracking control for tracking groove 202a is not executed as described in the above. In the operation at a time of visible image recording, there are features as a secondary operation such as focus control and detection of the laser irradiating position. Therefore, after explaining them, the main operation is explained.

At the time of visible image recording, since laser light is irradiated on the label surface, the tracking control to trace the groove 202a at a time of information recording cannot be executed.

Therefore, at the time of visible image recording, when the rotation direction of the optical disc 200 is defined as a main-scan direction, and when a diameter direction is considered as a sub-scan direction, the optical pickup 103 is moved by the stepping motor 131 in order to sub-scan the laser light irradiating position only a necessary amount to the diameter direction.

Here, when a minimum moving resolution of the optical pickup 103 by the stepping motor 131 is about 10 µm, a minimum pitch in the sub-scan the direction of the label surface is about same as 10 µm of this resolution.

Therefore, in the embodiment of the present invention, the focus control is executed so that a spot size of laser light to the label surface becomes to be about 10 μm that is a same value as the resolution, and laser power is changed and controlled corresponding to the image data corresponding to pixels of the visible image. Then, the visible image of which the distance of pixel sensibility is short and close is recorded.

On the other hand, at the time of visible image recording detection of the standard line and column in the optical disc 200 is executed as follows. A rotation detecting device 102 outputs a pulse signal FG of which frequency is corresponding to the spindle rotation velocity as described in the above. A phase locked loop (PLL) circuit 142 generates a clock signal CK multiplied by the frequency of the pulse signal FG and outputs the generated signal to the control unit 130. Also, a frequency divider 143 generates a standard signal SFG by frequency dividing the signal FG and provides it to the controlling unit 130.

Figure 5:
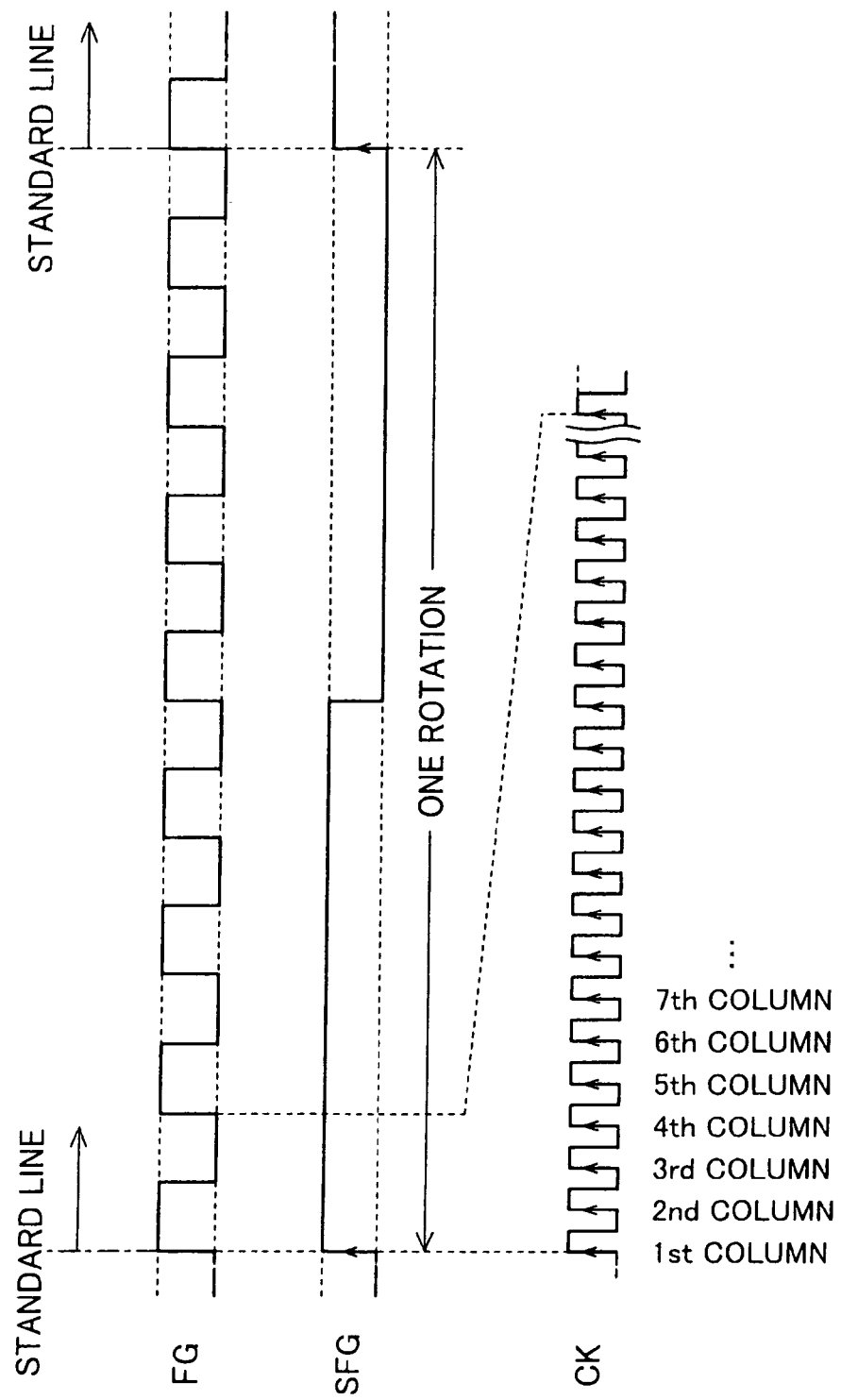
FIG. 5 is an image for explaining detection of a laser irradiating position.

Here, when the rotation detecting device 102 generates eight pulses as pulse signals FG during one rotation of the spindle motor 101, that is, while the optical disc 200 rotates once, as shown in FIG. 5, the frequency divider 143 frequency divides the signal FG into ⅛ to output as a standard signal SFG. Therefore, the controlling unit 130 can detect that a booting up timing of the standard signal SFG is s timing that the laser irradiating position passes the standard line of the optical disc 200.

Also, in this case, when a frequency multiplicity in the PLL circuit 142 is set to be a quotient that is the number of columns in a line is divided by eight, one cycle of the clock signal CK corresponds to the duration that the optical disc 200 rotates with angle for one column of the pixel arrangement. Therefore, the controlling unit 130 can detect how many sequence after the laser light irradiating position of the optical pickup 103 has passed the standard line of the optical disc 200 by counting the booting up timing of the clock signal CK in order from booting up the standard signal SFG.

Moreover, an expression of the standard line of the optical disc 200 should be said to be a standard line to a rotation axis of the spindle motor 101 in a strict sense of the wording. Since the optical disc 200 rotates with being chucked by a table (not shown in the drawing) directly connected with the rotation axis, the standard line to the rotation axis of the spindle motor 101 keeps a fixed position relationship with radiation of the optical disc 200. Therefore, one radiation in the optical disc 200 may be read as the standard line of the optical disc 200 as long as that condition is maintained.

Also, in the embodiment of the present invention, the booting up timing of the standard signal SFG is defined as a standard line passing timing of the optical disc 200, and the booting up timing of the clock signal CK is defined as a timing rotated with angle for one column of the pixel arrangement. In both cases, booting down timing may certainly be used.

The controlling unit 130 outputs a command to move the optical pickup 103 to the most inside point (the first line) of the optical disc 200. By this command, the motor controller 133 generates a signal necessary for making the optical pickup 103 move to the point, and the motor driver 132 makes the stepping motor 131 rotate. Then, the optical pickup 103 moves to the point.

Figure 6:
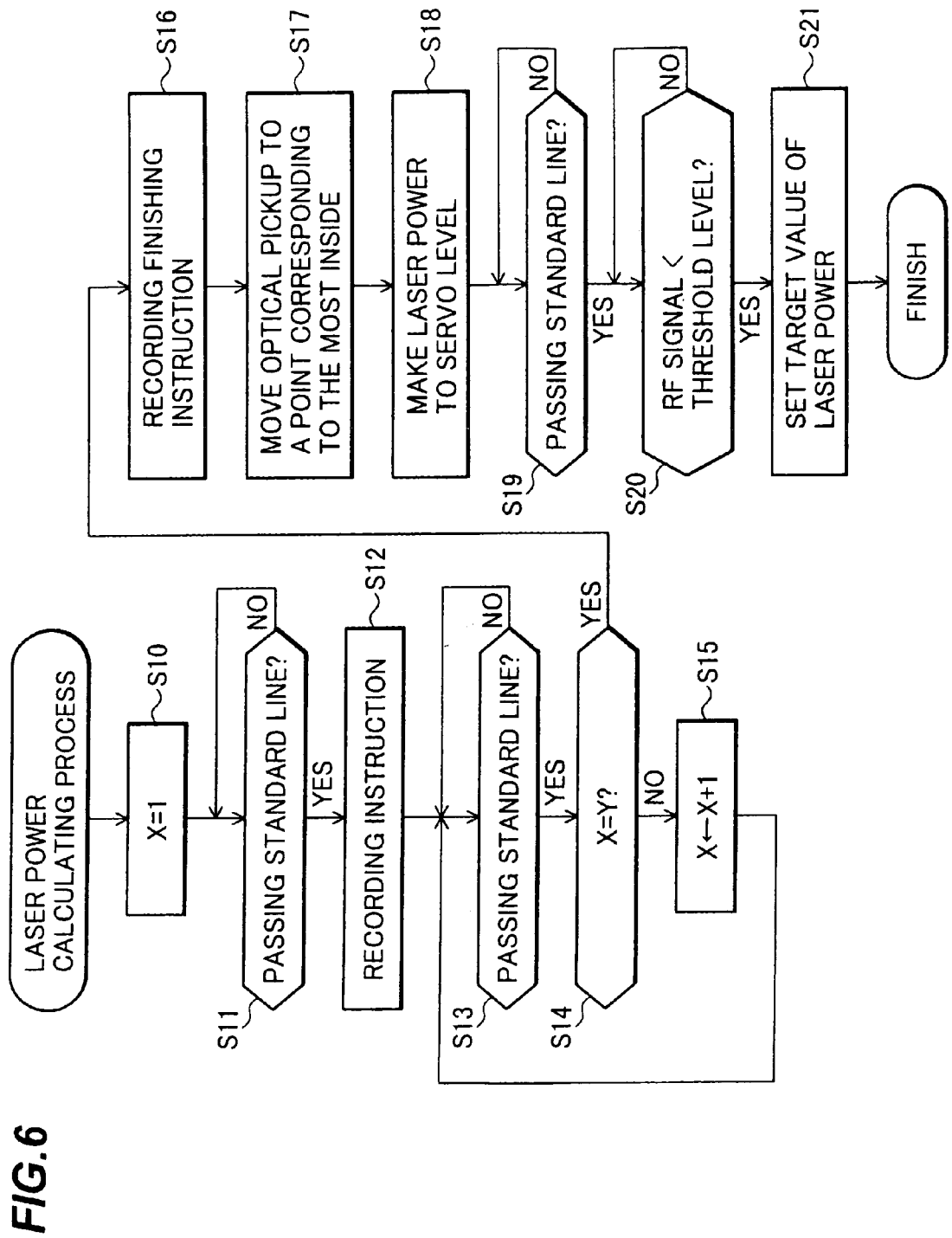
FIG. 6 is a flow chart showing an operation of a controlling unit at a time of calculating laser power

Next, the controlling unit 130 executes a laser power calculating process. This laser power calculating process is a process to obtain the laser power (write level) making a thermosensitive layer 205 of the optical disc 200 sufficiently discolored. Here, FIG. 6 is a flow chart showing an operation of a controlling unit at a time of the calculating laser power.

In this process, the controlling unit 130 sets "1" for a variant x first (Step S10). Here, the variant x is used for grasping a number of rotations in y rotation (y>1) to execute recording. Therefore, the rotation is grasped to be the first rotation by setting "1" for the variant x.

Then, the controlling unit 130 waits a booting-up timing of the standard signal SFG, that is, a timing when the standard line comes to the laser light irradiating position (Step S11). When the standard signal SFG is booted up, the controlling unit 130 outputs a predetermined recording command to start a test recording (Step S12). By this command, the laser driver 138 changes and controls the laser power of the laser diode 104 to the write level and the servo level. Then, this write level is gradually changed from a predetermined minimum level to a larger level by a laser power controlling circuit 140. Therefore, when the coloration temperature of the thermosensitive layer 205 of the optical disc 200 is low, since discoloration is made at a low-powered write level, discoloration is made soon after passing the standard line. On the other hand, when the coloration temperature of the thermosensitive layer 205 is high, discoloration is made late. That is, as the coloration temperature of the thermosensitive layer 205 of the optical disc 200 is high, a position discolored by laser light moves from the standard line to clockwise direction. The recording process is repeated at every one cycle of the standard signal SFG.

Next, the controlling unit 130 waits a booting-up timing of the standard signal SFG (Step S13). When the standard signal SFG is booted up, the controlling unit 130 judges whether the variant x equals to y or not (Step S14). When the judging result is negative, the controlling unit 130 increases the variant x by "1" (Step S15), and the process advances to Step S13. By doing that, the laser light at the same laser power as the last time is irradiated to the same position of the optical disc 200. On the other hand, when the judging result is positive, the controlling unit 130 outputs a command to finish recording (Step S16). By doing that, the laser light at the same laser power is irradiated to the same position of the optical disc 200 for plural times (y times), and then the recording process is finished.

Here, the reason to irradiate the laser light at the same laser power to the same position plural times is as follows. As described in the above, when the laser light is irradiated onto the label surface, the tracking control for tracking the groove 202a cannot be executed. Therefore, in a case of one recording, it is highly possible not to be able to trace the position (line) exactly at a time of reading out later. Then, by irradiating the same power laser light to the same position for the plural times, discoloration area with the same contrast is expanded to the diameter direction, and the discoloration area can be traced exactly at a time of reading out.

After that, the controlling unit 130 outputs a command for moving the optical pickup 103 to the most inside point of the optical disc 200 in order to read out the recorded area (Step S17). Also, the controlling unit 130 changes the laser power of the laser diode 104 to the servo level by the laser driver 138 (Step S18). Next, when the controlling unit 130 detects passing of the standard line (Step S19), the controlling unit 130 waits that the RF signal from an RF amplifier 108 becomes a predetermined threshold level or less (Step S20). The threshold level is a preset level for judging heat discoloration. Therefore, the controlling unit 130 waits that the laser irradiating position comes to the heat discolored position.

When the RF signal becomes the threshold level or less, the controlling unit 130 sets the laser power at the write level irradiated onto the position at a target value based on the light irradiating position at that time (Step S21). In the above-described recording process, since the laser power is gradually increased from the minimum level with the standard line being a starting timing, the target value of the laser power is set to be a minimum laser power necessary for discoloration.

Moreover, any laser powers that can make the heat discoloration can be the target value. However, as the laser power is increasing, the heating amount of the laser diode 104 becomes large. Therefore, not only the life of the laser diode 104 will be shorten, but also, it will be a factor for raising the temperature of the optical disc 200. Therefore, in the embodiment of the present invention, a minimum coloring power of the thermosensitive layer 205 of the set the optical disc 200 is obtained, and the laser power is defined as a target value. The operation described in the above is the operation at a time of the laser power calculating process.

Next, there is a laser power correcting process as a process executed after finishing the laser power calculating process. Even whether the later described recording process is executed or not, this laser power correcting process is always executed. First, an outline of the laser power correcting process is explained.

A temperature at a laser irradiating position and heat generation by laser can be represented by the following equations (a) and (b):

temperature at a laser irradiating position=heat generation by laser+temperature of optical disc    equation (a);

and heat generation by laser=laser power*heat transfer rate* spot size/linear velocity    equation (b).

Here, the heat transfer rate is a heat transfer rate of the laser power on the thermosensitive layer 205. Therefore, as recognized from the equation (a), when the heat by laser is changed so that the temperature change of the optical disc 200 is canceled, the temperature of the laser irradiating position can be fixed.

When the temperature of the laser irradiating position can be fixed, duration for the laser irradiating position to be the coloration temperature can be fixed, and therefore the recording sensitivity can be fixed.

On the other hand, as recognized from the equation (b), in order to change the heating by laser, either one of the laser power, the spot size and linear velocity may be changed. However, because the CAV method is adopted in the embodiment of the present invention, the control becomes to be complicated if the linear velocity is changed freely. Also, since it is the premise that the focus control of the spot size is executed to be about 10 μm, the spot size cannot also be changed freely.

Then, in the embodiment of the present invention, the recording sensitivity is controlled to be fixed, by changing the laser power.

Figure 7:
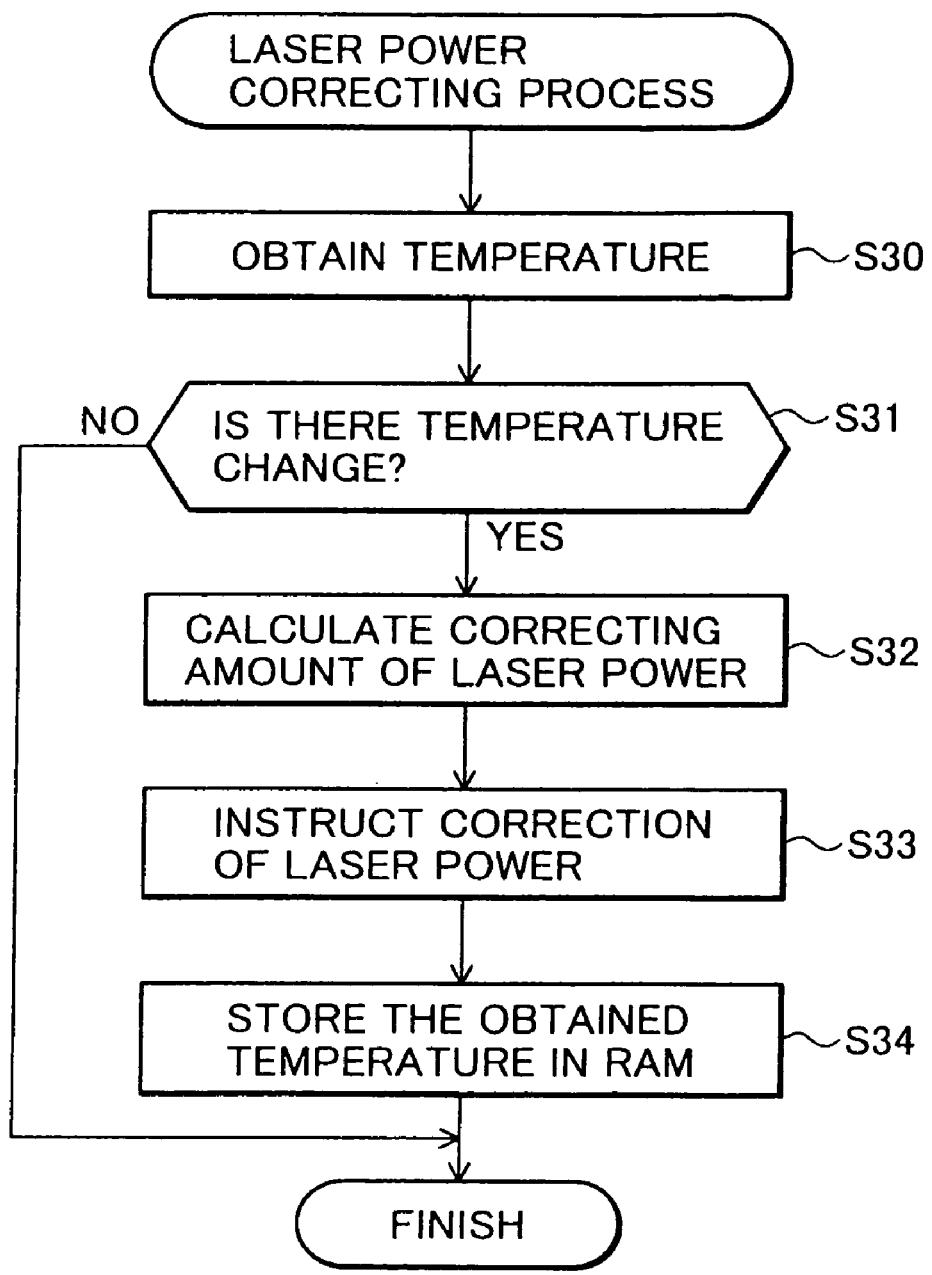
FIG. 7 is a flow chart showing an operation of the controlling unit at a time of a laser power correcting process.

Next, details of the laser power correcting process are explained. FIG. 7 is a flow chart showing an operation of the controlling unit 130 at the time of the laser power correcting process. This laser power correcting process is always executed by the controlling unit 130 at a predetermined cycle.

First, the controlling unit 130 obtains the temperature of the circuit substrate by a temperature detecting circuit 141 (Step S30), and judges whether the obtained temperature is different from the temperature input at the last time stored in the RAM or not (Step S31). When the judging result is negative, that is, when there is no temperature change, the controlling unit 130 terminates the laser power correcting process.

On the other hand, when there is temperature change, the judging result will be positive, and the controlling unit 130 calculates an amount of the laser power based on the temperatures input at this time and the last time (Step S32). Although various kinds of methods can be considered as the calculating methods of this correcting process, typical two methods are mentioned here.

The controlling unit 130 calculates a correcting amount of the laser power based on the temperatures input at this time and the last time by the following equation (c):

$$\text{correcting amount of laser power} = (\text{temperature input last time} - \text{temperature input this time}) / (\text{heat transfer rate} * \text{spot size} / \text{linear velocity}). \quad \text{equation (c)}$$

Here, the heat transfer rate and the spot size are fixed values set in advance. Since the embodiment of the present invention adopts the CAV method, the linear velocity is a value that can be easily calculated based on the position of the diameter direction of the laser light irradiating position. Moreover, in the embodiment of the present invention, a case that the temperature of the circuit substrate is regarded as the temperature of the optical disc 200 is explained. However, in a case of adopting a, structure such as temperature difference between the temperatures of the circuit substrate and the optical disc 200 is arisen, a value corrected the obtained temperature of the circuit substrate only by the temperature difference from the temperature set in advance.

For example, a table recording correlations between the laser powers and the heating temperatures by lasers is stored in the ROM. Then, the controlling unit 130 specifies the laser power for lowering the heating temperature by laser only by the temperature difference between the temperatures input at the last time and this time by referring the table being the present laser power as a standard. By doing that, the controlling unit 130 can obtain the correcting amount for setting the laser power to be the specified laser power.

Next, when the controlling unit 130 calculates the correcting amount of the laser power, it instructs the laser power controlling circuit 140 to correct the present laser power target value only by the correcting amount (Step S33). By doing that, the laser power controlling circuit 140 corrects the laser power of the laser diode 104. As described in the above, the target value of the laser power at the write level is corrected by this correction. Then, the controlling unit 130 renews the temperature stored in the RAM (temperature input at the last time) to the temperature input at this time (Step S34) and finishes the laser power correcting process. By that, when the temperature of the optical disc 200 changes, the laser power is executed a variable control in order to cancel the temperature change. Therefore, the temperature of the optical disc 200 at the laser irradiating position can be fixed, and recording sensitivity can also be fixed.

Figure 8:
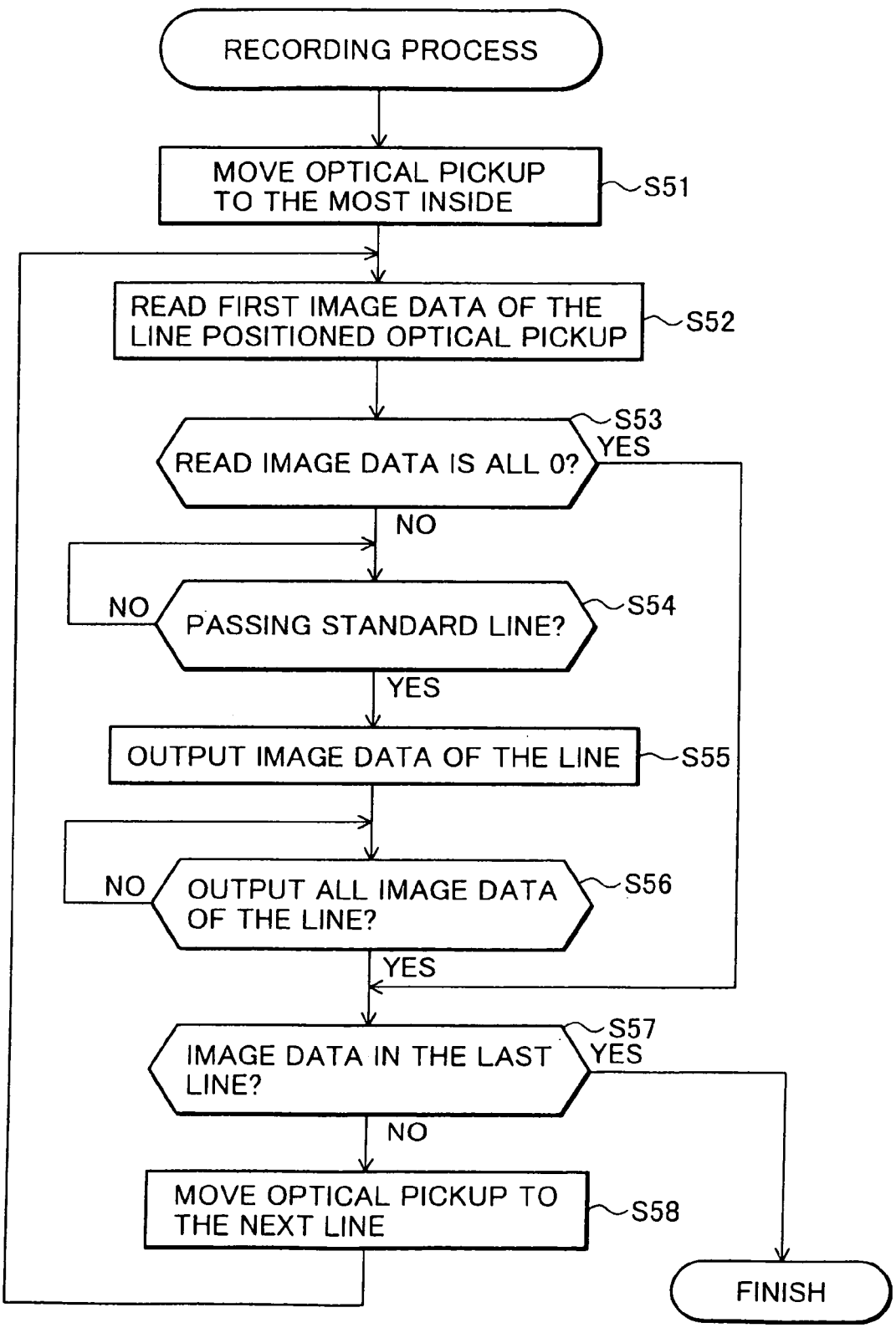
FIG. 8 is a flow chart showing an operation of the controlling unit at a time of a writing process.

Next, the recording process is explained. Assuming that the laser power calculating process has been finished and image data to be recorded has been provided from the PC 300 in the frame memory 134. FIG. 8 is a flow chart showing an operation of the controlling unit 130 at a time of the recording process.

First, the controlling unit 130 outputs a command to move the optical pickup 103 to the most inside point of the optical disc 200, and the optical pickup 103 moves to the point (Step S51). Since it is necessary to remove the area to which the recording at the laser power calculating process is executed, the most inside point at this time means the most inside point in a recordable (available) area.

Next, the controlling unit 130 reads in advance only the first one line of image data of the image data stored in the frame memory 134 where the optical pickup 103 is positioned (Step S52). Then, the controlling unit 130 judges whether all the image data for the one line read first is "0" or not (Step S53) The judgment that all the image data for one line is "0" means that it is necessary to heat discolorate this line of the thermosensitive layer 205. Therefore, when this judging result is positive, the controlling unit 130 skips processes and advances to Step S57 for shortening time necessary for the visible image recording.

On the other hand, when the judging result is negative, the controlling unit 130 waits a booting-up timing of the standard signal SFG (Step S54).

Then, the standard signal SFG is booted up, the controlling unit 130 reads out the image data for one line read in advance or the image data of the line from the frame memory 134, and provides th image data of each column at a synchronized timing for one cycle of the clock signal CK to the laser driver 138 (Step S55). By doing that, the controlling unit 130 controls the laser driver 138 to change the laser to the write level and the servo level corresponding to the image data. In concrete, when the image data is "1", the controlling unit 130 controls the laser power to the write level. When the image data is "0", the controlling unit 130 controls the laser power to the servo level. By that, the laser irradiating position at the write level is heat discolored.

As described in the above, since the image data of each column that consists the image data of one of the lines is provided at the synchronized timing for one cycle of the clock signal CK, change of the laser power is also executed at the synchronized timing for one cycle of the clock signal CK. Therefore, at each time when the optical disc 200 rotates at an angle corresponding to one pixel from the standard line, the laser light is irradiated at a power corresponding to the image data of the column corresponding to the laser irradiating position, and an image of one line of the visible image is recorded on the label surface.

Next, when all the image data in the one line is output (Step S56), the controlling unit 130 judges whether the output image data is the image data in the last line or not (Step S57). When the judging result is negative, the controlling unit 130 outputs a command to move the optical pickup 103 only by the position corresponding to the next line toward the diameter direction and move the optical pickup 103 to the next line (Step S58). Moreover, the controlling unit 130 advances the process to Step S52.

By doing that, the image data in the next line is read out from the frame memory 134, and the above-described processes, Steps S52 to S56, are repeated. By that, the image data of the visible image ar recorded one line by one line on the label surface.

Then, when the judging result of Step S57 is positive, that is, when the image data recording of the last line is finished, the controlling unit 130 finishes the recording process. By that, an image corresponding to the image data is recorded on the surface of the optical disc 200.

As described in the above, according to the optical disc recording apparatus 100 according to the embodiment of the present invention, since the laser power for certainly heat discolorate the thermosensitive layer 205 is determined by executing the test recording with changing the laser powers, the visible image can be certainly recorded. Moreover, since the optical disc recording apparatus 100 corrects the laser power corresponding to the temperature change of the optical disc 200, the temperature at the laser irradiating position can be fixed, and the temperature at the laser irradiating position can be fixed, and recording sensitivity can also be fixed. By that, problems, for example, the outline of a visible image will fade and spots in contrast will be produced can be solved, and the visible image can be recorded at high quality. Therefore, a visible image can be recorded on the label surface at high quality without a printer.

The present invention is not limited only to the above embodiments. It is apparent that various modifications, improvements, combinations, and the like can be made by those skilled in the art. For example, the following modifications can be possible.

Although, in the embodiment of the present invention described in the above, the case that the temperature detecting circuit 141 measures the temperature of the circuit substrate by the temperature-dependent device has been explained, the temperature may be estimated based on a junction voltage of a transistor on the circuit.

Further, although the case that the temperature detecting circuit 141 measures the temperature of the circuit substrate in order to detect the temperature of the optical disc 200 has been explained, the temperature of the laser diode 104 and the inner temperature of the optical disc recording apparatus 100 may be measured. For example, since operation current of the laser diode 104 at a time of obtaining predetermined receiving write level changes depending on the temperature, the temperature of the laser diode 104 can be detected by monitoring the electric current value and the voltage value at that time Also, when the temperature-dependent device is positioned near the optical disc 200, the surrounding temperature of the optical disc 200 can be measured. Moreover, the temperature detecting circuit 141 detects plurality of temperatures such as the temperature of the laser diode 104, the inner temperature of the optical disc recording apparatus 100 and the like, and the temperature of the optical disc 200 may be estimated precisely by a calculating process using these temperature values.

Also, in the embodiment of the present invention described in the above, the optical disc 200 may be preferably rotated at high speed for a fixed period immediately after setting the optical disc 200 in the optical disc recording apparatus 100 and immediately before executing recording process, or immediately before executing the laser power calculating process. By rotating at high speed for a fixed period, the temperature of the optical disc 200 can be the same as that of the optical disc recording apparatus 100. If the visible image is recorded in a condition that there is a large difference between the temperature of the optical disc 200 and the inner temperature of the optical disc recording apparatus 100, temperature change of the optical disc 200 is large at a starting area of the recording, it is possible that spot in contrast will be produced. Then, if a visible image is recorded in a condition that the temperature of the optical disc 200 and that of the optical disc recording apparatus 100 are the same, the case that spots in contrast are produced at a starting area of the recording can be prevented.

Also, in the embodiment described in the above, in a case that the coloration temperature of the thermosensitive layer 205 of the optical disc 200 is extraordinary high and the laser power obtained by the laser power calculating process is extremely high, the rotation velocity of the optical disc 200 (rotation velocity of the spindle motor 101) is slow down, and the recording process may be executed at high laser power (for example, at a full power in a usage range). However, in a case that the high laser power is output, it is possible that the temperature of the laser diode 104 exceeds a guaranteed temperature. In that case, recording is interrupted, it is waited that the laser diode 104 becomes cold, or the laser diode may be cool down positively, by a wind pressure speeding up the velocity.

Although, in the embodiment described in the abov, the case for controlling the recording sensitivity to be fixed by changing the laser power has been explained, the temperature of the laser irradiating position may be changed by changing the linear velocity as shown in the equation (a). Therefore, instead of the method for changing the laser power, the recording sensitivity may be controlled by changing the linear velocity. In this case, the rotation velocity of the optical disc 200 may be controlled based on the temperature detected by the temperature detecting circuit 141.

Although, in the embodiment described in the above, the case for specifying the laser power that makes the thermosensitive layer 205 of the optical disc 200 heat discoloration has been explained, a structure that does not need the laser power calculating process may be used by determining the laser power that can certainly perform the heat discoloration.

Also, a structure that does not need the laser power calculating process and the laser power correcting process may be used by setting the laser power simply based on only the temperature detected by the temperature detecting circuit 141.

Although, in the embodiment described in the above, the case that the laser power correcting process corrects the laser power corresponding to the change in temperature detected has been explained, a changing rate of the light receiving level at a time of irradiating to the heat discoloration position of the label surface may be obtained to execute feedback control of the laser power in order to be a fixed the changing rate.

In concrete, as shown in FIG. 9, by detecting a level LA at a time of a rising (A point) of the RF signal (or receiving light signal Rv) and a level LB at B point after passing a predetermined period from th rising time, the laser power (write level) may be corrected so that the ratio of the levels LA and LB satisfies a range of a predetermined ratio. Moreover, in this drawing, waveforms of the laser light and the RF signal before and after correction are indicated for easiness of the explanation. More in concrete, the clock signal CK is multiplied, and a clock signal CK1 at higher frequency is generated. Then, the A point can be detected by rising the clock signal CK, and the B point can be detected by counting a predetermined numbers of the clock signal CK1 after rising the clock signal CK. When the number of the count of this clock signal CK is changed, the B point can also be changed. When the laser power is corrected corresponding to the changing rate of the light receiving level, the thermosensitive layer 205 can certainly be discolored. Also, since the thermosensitive layer 205 can be discolored at a desired timing (B point in the above-described case), the recording sensitivity can be fixed, and an effect as the above-described embodiment can be obtained.

Moreover, the methods to measure the changing rate of the light receiving level are not always limited to the before-described two methods, and change (a variation property) of the changing rate of the light receiving level may be obtained by measuring levels at more points. When the laser power is corrected so that the variation property of the light receiving level at the heat discoloration position becomes a targeted variation property, the recording sensitivity can be fixed more precisely. Also, in this case, instead of the method for controlling the laser power corresponding to the changing rate of the light receiving l v l, it is needless to say that the linear velocity (in concrete, rotation velocity of the optical disc 200) may be controlled corresponding to the changing rate of the light receiving level.

Moreover, although, in the embodiment described in the above, the structure for recording the visible image by irradiating laser light on the thermosensitive layer 205 is explained, since the recording layer used for information recording is also heat discolored by the laser light, the recording layer 202 can also be used as a discoloration layer. When the recording layer is used as the discoloration layer, the process can proceed to the visible image recording operation immediately after recording the recording data on the recording surface without turning the optical disc 200 over. If the recording layer is used as the discoloration layer, the visible image at high quality can be recorded also on a general CD-R without the thermosensitive layer 205.

The invention claimed is:

1. An optical disc recording apparatus, comprising:
   a light irradiator that irradiates a laser light onto an optical disc having a discoloration layer;
   a position controller that controls an irradiating position of the laser light;
   a laser power controller that controls a laser power of the laser light in accordance with input image data;
   a temperature detector that detects a temperature of the optical disc; and
   a laser power corrector that corrects laser power for discoloration in the discoloration layer by the laser light in accordance with the detected temperature in order to cancel a change in a temperature of the optical disc, wherein the laser power controller calculates a laser power correction amount based on the detected temperature and a previously input temperature.

2. The optical disc recording apparatus according to claim 1, wherein the temperature detected by the temperature detector is compared to a previously input temperature.

3. The optical disc recording apparatus according to claim 1, wherein the laser power controller terminates laser power correction when the detected temperature is equal to a stored temperature.

4. The optical disc recording apparatus according to claim 1, wherein a linear velocity of the optical disc is calculated based on a position of a diameter direction of a laser light irradiating position.

5. The optical disc recording apparatus according to claim 1, wherein a linear velocity of the optical disc is controlled based on a changing rate of a light receiving level.

* * * * *